United States Patent [19]

Brooks et al.

[11] Patent Number: 5,696,190
[45] Date of Patent: Dec. 9, 1997

[54] PHENOLIC SCORCH RETARDERS

[75] Inventors: Lester A. Brooks, Rockmart, Ga.; C. Richard Costin; Walter R. Nagel, both of West Chester, Pa.

[73] Assignee: Sartomer Company, Exton, Pa.

[21] Appl. No.: 495,347

[22] Filed: Jun. 27, 1995

[51] Int. Cl.⁶ .................................................. C08K 5/17
[52] U.S. Cl. .................. 524/248; 524/186; 524/323; 525/380
[58] Field of Search .................... 524/248, 186, 524/323; 525/380

[56] References Cited

U.S. PATENT DOCUMENTS

| | | | |
|---|---|---|---|
| 4,857,571 | 8/1989 | Reiter | 524/248 |
| 4,942,202 | 7/1990 | Zama | 525/104 |
| 5,079,304 | 1/1992 | DeMarco | 525/329.8 |

*Primary Examiner*—Fred Zitomer
*Attorney, Agent, or Firm*—Michael B. Fein

[57] ABSTRACT

Curable and cured elastomer compositions, and methods for the preparation thereof, in which vulcanization is retarded by incorporating the acid salts of certain methyl substituted aminoalkyl phenols into the compositions to be vulcanized. The compositions include an elastomer, a scorch retarding effective amount of a phenolic scorch retarder acid salt, and a cure effective amount of a free radical generating compound.

46 Claims, No Drawings

PHENOLIC SCORCH RETARDERS

FIELD OF INVENTION

The present invention relates to improved scorch retarders for free radical cured elastomers. In particular, the present invention relates to free radical curable elastomer compositions in which vulcanization is retarded by incorporating the acid salts of certain methyl substituted aminoalkyl phenols into the compositions to be vulcanized.

BACKGROUND OF THE INVENTION

The use of aminoalkyl phenols as scorch retarders is well known in the art. For example, U.S. Pat. No. 4,857,571 to Reiter et. al discloses the use of methyl substituted aminoalkyl phenols as scorch retarders in free radical cured elastomer compositions. The phenolic scorch retarders are advantageous in that their use eliminates the need for the carcinogenic materials and lachrymators conventionally employed as retarders in elastomer compositions.

However, phenolic retarders suffer from several disadvantages. For example, their use results in the development of discoloration of the elastomer upon aging. Additionally, the phenolic retarders are insoluble in many of the liquid monomer coagents used in elastomer compositions. Further, the phenolic scorch retarders are highly odoriferous.

SUMMARY OF THE INVENTION

The present invention is directed to curable and cured elastomer compositions, comprising: (a) an elastomer; (b) a scorch retarding effective amount of a phenolic scorch retarder acid salt; and (c) a cure effective amount of a free radical generating compound.

The present invention is also directed to a method for providing a curable elastomer composition, comprising the steps of: (a) providing a phenolic scorch retarder acid salt; (b) incorporating the phenolic scorch retarder acid salt into an elastomer; and (c) incorporating the free radical generating compound into the elastomer.

These and other features, aspects, and advantages of the present invention will become better understood with reference to the following description and dependent claims.

DESCRIPTION OF THE PREFERRED EMBODIMENTS

The term "phenolic scorch retarder," as used herein, is intended to include aminoalkyl phenol compositions corresponding to the structural formula:

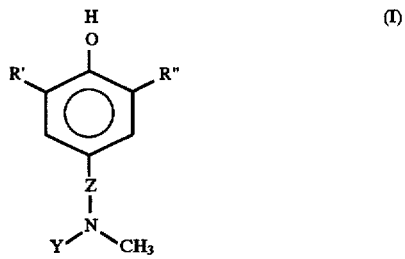

(I)

wherein R' and R" are each independently lower alkyls of from 1 to 6 carbon atoms, Z is an alkylene radical containing from 1 to 12 carbon atoms, and Y is an alkyl, cycloalkyl, aryl, aralkyl radical, or a lower alkyl-substituted derivative of the aryl radicals containing from 1 to 6 carbon atoms in the alkyl chain. Preferably, R' and R" are each tertiary alkyl hydrocarbons, Z is an alkylene radical containing from 1 to 3 carbon atoms, i.e. methylene, ethylene, and propylene radicals, and Y is a lower alkyl radical containing from 1 to 6 carbon atoms.

Exemplary compounds conforming to the above formula include, without limitation: 2,6-dimethyl-4-[methyl (ethyl)-amino]methyl phenol; 2,6-diethyl-4-[dimethylamino] methyl phenol; 2,6-di-t-butyl-4-[dimethylamino]methyl phenol; 2,6-di-t-butyl-4-[dimethylamino]ethyl phenol; 2,6-di-t-amyl-4-[dimethylamino]ethyl phenol; 2,6-di-t-butyl-4-[methyl(cyclohexyl)amino]methyl phenol; 2,6-di-t-butyl-4-[methyl(phenyl)amino]n-propyl phenol; 2,6-di-t-amyl-4-[methyl(benzyl)amino]ethyl phenol; 2,6-di-t-butyl-4-[methyl(4-t-butylphenyl)amino]n-butyl phenol; 2,6-di-n-propyl-4-[methyl(4-t-butyl-benzyl)amino]n-propyl phenol; 2,6-di-t-butyl-4-[dimethylamino]n-hexyl phenol; and mixtures thereof. The above-disclosed phenolic scorch retarders are described in U.S. Pat. No. 4,857,571, which is incorporated herein in its entirety. Most preferred for use in the present invention is 2,6-di-t-butyl-4-[dimethylamino]methyl phenol.

The present invention is based on the discovery that phenolic scorch retarders, when converted to their acid salts, provide improved scorch retarders for free radical curable elastomers. More specifically, it has been discovered that the acid salts of phenolic scorch retarders provide effective scorch retarding for free radical curable elastomer compositions while, at the same time, unexpectedly minimize the undesirable color formation associated with conventional phenolic scorch retarders. Additionally, the phenolic scorch retarder acid salts exhibit improved solubility in liquid monomer coagents thereby providing a method for the in situ incorporation of a miscible retarder into elastomer compositions. Finally, the acid salts are less odoriferous than conventional phenolic scorch retarders.

The phenolic scorch retarders contain a strongly basic amino group capable of forming salts with a variety of acids to produce substituted ammonium salts. Therefore, the acids useful for forming the acid salts of the present invention include those organic and inorganic acids capable of neutralizing the amino group of the phenolic scorch retarder to produce an ammonium salt.

Exemplary organic acids include, without limitation, carboxylic acids such as formic, acetic, propionic, butyric, valeric, hexanoic, heptanoic, octanoic, pelargonic, decanoic, lauric, myristic, palmitic, stearic, oleic, and benzoic acids, carboxylic acids which contain other functional groups such as glycolic, lactic, glyoxylic, acrylic, vinylacetic, phenylacetic, itaconic, malonic, and cyanoacetic acids, and isomers of the foregoing. Inorganic acids that may be utilized include, without limitation, sulfuric, hydrochloric, phosphoric, and paratoluenosulfonic acids.

Preferably, propionic acid is used to form the phenolic scorch retarder acid salt. Propionic acid has been found to provide a phenolic scorch retarder acid salt that is low in color formation and odor, has excellent scorch retarder activity, and is soluble in monomer coagents.

Any conventional method may be used to form the phenolic scorch retarder acid salt. For example, the phenolic scorch retarder may be slurried in heptane to which the acid is added, mixed, and reacted. The slurry is then filtered and dried to retrieve the resulting phenolic scorch retarder acid salt. Alternatively, the phenolic scorch retarder may be dissolved in a monomer coagent and, subsequently, the organic or inorganic acid added to form the phenolic scorch retarder acid salt in-situ.

The phenolic scorch retarder acid salt may be incorporated into the elastomer by addition to the flux roll followed by cutting and mixing to form a uniform smooth band.

Alternatively, the phenolic scorch retarder acid salt may be dissolved in a monomer coagent, the solution then being added to the elastomer.

The amount of phenolic scorch retarder acid salt used is an amount effective to increase scorch safety, i.e., a scorch retarding effective amount. Generally amounts from about 0.01 to about 2.0 parts by weight, preferably 0.02 to about 0.5 parts by weight, per 100 parts by weight of the elastomer used.

Elastomers with which the phenolic scorch retarder acid salts may be utilized in accordance with the present invention include, without limitation, the elastomeric organic high polymers, including natural rubber and the various synthetic rubbers which cure with a free radical generating compound or radiation source. In general, these curable rubbers are polymers of conjugated dienes or polymers with easily abstractible hydrogen wherein the monomers are linked through carbon-carbon bonds. Illustrative synthetic rubbery polymers of conjugated dienes include, without limitation: synthetic polyisoprene, styrenebutadiene rubbers, polybutadiene rubbers, butyl rubber, bromobutyl rubber, chlorobutyl rubber, the neoprenes, ethylene propylene rubbers, nitrile elastomers, silicone elastomers, thermoplastic elastomers, fluoroelastomers, high styrene butadiene copolymers, vinyl acetate ethylene copolymers, chlorinated polyethylene rubber, chlorosulfonated polyethylene elastomer, polyethylene and reclaimed rubber. All of these elastomers are commercially available.

Vulcanizing agents that decompose to generate free radicals during the curing cycle may be employed as curing agents to cure the elastomers in the compositions and methods of the present invention. Suitable free radical generating compounds include, without limitation, peroxides, percarbonates, azo compounds and the like.

Ditertiary peroxide curing compounds are the preferred free radical generating compounds, which peroxides and their homologs and analogs, all correspond essentially to the structural formula:

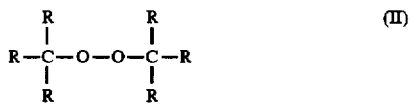

(II)

These ditertiary peroxide curing agents contain at least one peroxy group disposed between tertiary carbon atoms, which tertiary carbon atoms are linked to carbon atoms constituting portions of each of the R groups, which R groups may be alkyl (including straight, branched or cyclic), alkenyl, or aryl groups, or mixtures of such groups, and which R groups may be further substituted by non-hydrocarbon groups, for example, ethers, additional peroxy groups, or halogens, such as chlorine, which inorganic peroxides do not interfere with either the curing process or the cured elastomeric product.

Illustrative organic peroxides in accordance with formula (II) include: di-t-butyl peroxide, dicumyl peroxide, 2,5-bis (t-butylperoxy)-2,5-dimethyl-hexane, α,α'bis-(t-butylperoxy) diisopropyl benzene, t-butylcumyl peroxide, 2,5-dimethyl-2,5-di(t-butylperoxy) hexyne-3.

Suitable organic peroxides may also include, without limitation, acyl peroxides, peroxy ketals, peroxy esters, and peroxy carbonates. Examples of such peroxides include, without limitation, dibenzoyl peroxide, di-(p-chlorobenzoyl) peroxide, di-(2,4-dichlorobenzoyl) peroxide, methyl ethyl ketone peroxide, cyclohexanone peroxide, t-butyl peroxide, t-butyl peroxy(2-ethylhexanoate), t-butylperoxyisobutyrate, O,O-t-butyl-O-isopropylmonoperoxy-carbonate, t-butylperoxy pivalate, dimethyl-di(benzoylperoxy)hexane, t-butyl-peroxy (2-ethylbutyrate), 1,1-di-t-butyl peroxy-3,3,5-trimethylcyclohexane, and n-butyl-bis(t-butylperoxy)-valerate, t-butylperoxy benzoate, 1,1-di(t-butylperoxy) cyclohexane, 4-methyl-4-butylperoxy-2-pentanone, ethyl 3,3-di(t-butylperoxy) butyrate, O,O-t-butyl O-(2-ethylhexyl) monoperoxy carbonate and the like. The foregoing organic peroxides may be used alone or in combination and are commercially available.

The amount of free radical generating compound used in the present invention may be varied depending on the elastomer and monomer coagent selected. Hence, the required amount of free radical generating compound required to practice the present invention is a cure-effective amount readily ascertainable by one of ordinary skill in the art. Generally, an amount from about 0.1 to about 15 parts by weight, preferably from about 0.5 to about 10 parts by weight, per hundred parts by weight of the elastomer employed.

The elastomer compositions and methods of the present invention additionally utilize one or more polyfunctional monomer coagents, such as acrylic or methacrylic monomers, allylic cross-linking coagents such as allylic esters, ethers and cyanurates, metal salts of α,β unsaturated carboxylic acids as cross-linking coagents. Monomer coagents which may be utilized include, without limitation: trimethylol propane tri(meth)acrylate, pentaerythritol tetra (meth)acrylate, glycerol tri(meth)acrylate, trimethylol ethane tri(meth)acrylate, 1,3-butylene glycol di(meth) acrylate, ethylene glycol dimethacrylate, 1,4-butylene glycol dimethacrylate, polyethylene glycol 200 dimethacrylate, di-α-olefin derived polymethylene di(meth)acrylates and mixtures thereof with alkyl mono(meth)acrylates, dipentaerythritol tetra(penta)acrylate and methacrylate, di-trimethylol propane tetraacrylate and methacrylate, diallyl phthalate, diallyl chloroendate, diallyl isophthalate, diallyl terephthalate, triallyl cyanurate, triallyl isocyanurate, triallyl trimellitate, the diallyl ethers or the triallyl ethers of trimethylol propane, trimethylol ethane and pentaerythritol, calcium di(meth)acrylate, and zinc di(meth)acrylate (or their monobasic salts). Also employable as polyfunctional monomers are the poly(meth)acrylate derivatives of oxyalkylated polyols.

The amount of monomer coagent utilized is a crosslinking effective amount, generally from about 0.01 to about 100 parts by weight per 100 parts by weight of the elastomer. Preferably, amounts of from about 0.1 to about 20 parts by weight per 100 parts by weight of the elastomer used.

Without departing from the scope of the present invention, and as appreciated by those skilled in the art, inert fillers may be included in the methods and curable compositions of the invention. If an inert filler is desired, any known or conventional filler which does not interfere with the vulcanization process described herein may be used, and such fillers are desirable in finely divided form. Suitable fillers include, but are not limited to, the following: silica and silicates, thermal blacks (i.e., furnace, channel or lamp carbon black), clays, kaolin, diatomaceous earth, zinc oxide, cork, titania, cotton floc, cellulose floc, leather fiber, elastic fiber, plastic flour, leather flour, fibrous fillers such as glass and synthetic fibers, metal oxides and carbonates and talc. The amount of inert filler is dictated by its type and the intended end use of the composition and, in general, may be less than about 30 parts by weight per 100 parts by weight of the elastomer and, more preferably, less than about 15 parts.

Other additives which may be added to the curable composition of the present invention, depending upon the intended end-use of the cured elastomer, include antioxidants, UV stabilizers, antiozonants, plasticizers, mold release agents, tackifiers, anti-tack agents, dispersants, solvents, softening agents, fatty acids, processing aids, coloring agents and the like.

The aforementioned ingredients are mixed by any conventional means. Mixing may be accomplished by charging the ingredients to a Banbury mixer or a rubber mixing mill and intimately mixing the ingredients until the composition is uniform. The temperature of the mixing operation is not critical, but should be below temperatures at which the curing reaction commences. Generally, normal rubber milling practice is employed.

Curing times, in general, range from about 1 to 30 minutes and preferably from about 5 to 15 minutes. Cure temperatures should be sufficient thermally decompose the free radical generating compound. Thus, the selection of the cure temperature will be predicated mainly upon the free radical generating compound that is selected. The temperatures useful in the present invention may vary between wide limits such as from 90° C. to 250° C. and preferably from 140° C. to about 215° C. For curing large rubber rolls, cure times of 24 hours are common to avoid stressing the roll.

The invention will be clarified further by a consideration of the following examples, which are intended to be purely exemplary.

EXAMPLES

In the following Tables, all of the ingredients are expressed in parts by weight unless noted otherwise.

Example 1

As a control, 4.3 g. of 2,6-di-t-butyl-4-[dimethylamino] methyl phenol, available as Ethanox 703™, were added to each of 95.7 g. trimethylol-propane triacrylate and 95.7 g. trimethylopropane trimethacrylate without stirring. The dissolution time for the Ethanox 703™ was noted, rapid solvation being considered excellent, and the results reported on Table 1.

Example 2

4.2 g of acetic acid was added to a slurry of 18.4 g of Ethanox 703™ in 40 ml of heptane. A mild temperature rise was noted. The resulting acetate salt was recovered by filtering and then dried. 4.3 g. of the resulting acetic acid salt were added to each of 95.7 g. trimethylolpropane trimethacrylate and 95.7 g. trimethylolpropane triacrylate and tested for dissolution time as in Example 1.

Example 3

The formulation and procedures of Example 2 were utilized except that 5.2 g. propionic acid were substituted for the acetic acid of Example 2.

Example 4

The formulation and procedures of Example 2 were utilized except that 8.1 g. hexanoic acid was substituted for the acetic acid of Example 2.

Dissolution results for the salts of Examples 1 through 4 are reported on Table 1.

TABLE 1

| Example | Dissolution in trimethylolpropane trimethacrylate | Dissolution in trimethylolpropane triacrylate |
|---|---|---|
| 1 | Excellent | Fair–poor |
| 2 | Poor | Poor |
| 3 | Excellent | Excellent |
| 4 | Very poor | Very poor |

Example 5

2 g. Ethanox 703™ were blended with each of 98 g. zinc diacrylate and 98 g. of zinc dimethacrylate. Both the Ethanox 703™-zinc diacrylate and the Ethanox 703™-zinc dimethacrylate blends were aged for a one month and a three month period and observed for color development. The results are reported on Table 2.

Example 6

The formulation and procedure of Example 5 were utilized except that the propionic acid salt of Example 2 was substituted for the Ethanox 703™ of Example 5. Test results are reported on Table 2.

TABLE 2

| Example | Zinc diacrylate One month | Zinc diacrylate Three months | Zinc dimethacrylate One month | Zinc dimethacrylate Three months |
|---|---|---|---|---|
| 5 | Yellow | Yellow | Yellow | Yellow |
| 6 | White | White | White | White |

Example 7

9.2 g. Ethanox 703™, yellow in color, was mixed for one hour in 274 g. trimethylolpropane triacrylate, warmed to 95° F., until dissolved. 2.6 g. propionic acid was added to the solution with no noted rise in temperature. The solution remained light yellow in color over a twenty four hour period.

Example 8

3.5 g. Ethanox 703™ were mixed for one hour in 100 g. trimethylolpropane trimethacrylate warmed to 95° F. until dissolved. The solution was warmed to 60° C. and 1.1 g. propionic acid added forming a liquid that was orange in color which exhibited a mild acid odor.

Example 9

2.1 g. Ethanox 703™ were added to 40 g. trimethylolpropane trimethacrylate and mixed as in Example 8. 0.7 g. vinyl acetic acid were added resulting in an orange colored liquid that exhibited a mild acid odor.

Example 10

The procedure of Example 9 was utilized except that 1.8 g. Ethanox 703™ were substituted for the 2.1 g. of Example 9 and 0.8 g. hexanoic acid were substituted for the vinyl acetic acid of Example 9. The resulting liquid was orange in color and exhibited a slightly acid odor.

Example 11

The formulation and procedure of Example 10 was utilized except that 0.9 g. itaconic acid were substituted for the hexanoic acid of Example 10. The resulting liquid was orange colored with a strong pungent odor.

Example 12

5.2 g. propionic acid were added to 40 ml heptane. Subsequently, 18.4 g. Ethanox 703™ were added gradually. The temperature of the solution increased 1° F. after the Ethanox 703™ addition was completed and the resulting liquid was light yellow in color. The liquid was filtered through a 2 micron filter and the solid product washed with heptane and refiltered, the resulting product being white.

The foregoing demonstrated that the phenolic scorch retarder acid salt was white, any yellow color being the result of contamination by unreacted Ethanox 703™.

Example 13

As a control formulation, a batch of nitrile butadiene rubber ("NBR"), available as HYCAR™ 1042, was masticated on a two roller mill until an acceptable bead was established in the conventional manner. Thereafter, for each 100 parts of NBR, and in accordance with the recipe listed on Table 3, 65 parts of semi-reinforcing carbon black N-365, 15 parts of dioctyl phthalate, 5 parts of zinc oxide, 1 part stearic acid, 1 part of polymerized 1,2-dihydro-2,2,4-trimethylquinoline, an antioxidant available as AGERITE™ Resin D, 5 parts of dicumyl peroxide, available as DICUP™ 4OKE, and 10 parts of zinc diacrylate were added slowly to the flux roll and the band was cut and mixed until a uniform, smooth band was developed.

Specimens of 75 mil thickness were compression molded and cured for 20 minutes at 320° F. and tested on a Thwing-Albert tensile tester at 20 IPM jaw separation speed. The results obtained are reported on Table 3.

Example 14–16

Rubber compositions were produced and tested by repeating the procedure of Example 13 except that the recipes for Examples 14–16, which may be found on Table 3, were followed.

Example 14 involved the addition of 0.2 parts by weight of the acetic acid salt of Example 2 and the substitution of 9.8 parts of zinc diacrylate for the 10 parts of Example 13.

Example 15 utilized the formulation of Example 14 except that 0.2 parts of the propionic acid salt of Example 3 was substituted for the salt of Example 14.

Example 16 utilized the formulation of Example 14 except that 0.2 parts of the n-caproic acid salt of Example 4 was substituted for the salt of Example 14.

Vulcanization characteristics were determined for Examples 13 and 15 with a Monsanto Cure Meter ODR using a 1° arc at 320° F. Characteristics measured include $TS_2$, $TS_5$, and maximum torque (MHF) and the results are reported on Table 3.

TABLE 3

| Example | 13 | 14 | 15 | 16 |
|---|---|---|---|---|
| NBR | 100 | 100 | 100 | 100 |
| carbon black | 65 | 65 | 65 | 65 |
| dioctyl phthalate | 15 | 15 | 15 | 15 |
| zinc oxide | 5 | 5 | 5 | 5 |
| stearic acid | 1 | 1 | 1 | 1 |
| Agerite ™ Resin D | 1 | 1 | 1 | 1 |
| Dicup ™ 4OKE | 5 | 5 | 5 | 5 |
| zinc diacrylate | 10 | 9.8 | 9.8 | 9.8 |
| acetic acid salt | — | 0.2 | — | — |
| propionic acid salt | — | — | 0.2 | — |
| hexanoic acid salt | — | — | — | 0.2 |
| Tensile Properties | | | | |
| Tensile strength (PSI) | 2800 | 2770 | 2820 | 2530 |
| Elongation (%) | 200 | 210 | 190 | 170 |
| Modulus (100) (PSI) | 1660 | 1610 | 1730 | 1660 |
| Scorch Time $TS_2$ (min.) | 2.1 | — | 2.0 | — |
| Scorch Time $TS_5$ (min.) | 2.6 | — | 2.6 | — |
| MH (in-lb.) | 46.2 | — | 53.5 | — |

Example 17

As a control, a rubber composition was produced by repeating the procedure for Example 13. The formulation was then tested for vulcanization characteristics as in Example 13, the test results reported on Table 4.

Examples 18–20

Rubber compositions were produced and tested by repeating the procedure for Example 17 except that the recipes for Examples 18 through 20, which may be found on Table 4 were followed.

Example 18 involved the substitution of 9.8 parts zinc dimethacrylate for the zinc diacrylate of Example 17.

Example 19 involved the substitution of 0.26 parts of the propionic acid salt of Example 12 for the 0.2 parts Ethanox-703 of Example 17 and the substitution of 9.74 parts zinc diacrylate for the 9.8 parts zinc diacrylate of Example 17.

Example 20 involved the substitution of 0.26 parts of the propionic acid salt of Example 12 for the 0.2 parts Ethanox-703 of Example 18 and the substitution of 9.74 parts zinc dimethacrylate for the 9.8 parts of Example 18.

TABLE 4

| Example | 17 | 18 | 19 | 20 |
|---|---|---|---|---|
| NBR | 100 | 100 | 100 | 100 |
| carbon black | 65 | 65 | 65 | 65 |
| dioctyl phthalate | 15 | 15 | 15 | 15 |
| zinc oxide | 5 | 5 | 5 | 5 |
| stearic acid | 1 | 1 | 1 | 1 |
| Agerite Resin D | 1 | 1 | 1 | 1 |
| Dicup 4OKE | 5 | 5 | 5 | 5 |
| zinc diacrylate | 9.8 | — | 9.74 | — |
| zinc dimethacrylate | — | 9.8 | — | 9.74 |
| Ethanox-703 | 0.2 | 0.2 | — | — |
| propionic acid salt | — | — | 0.26 | 0.26 |
| Scorch Time $TS_2$ (min.) | 2.0 | 2.0 | 2.2 | 2.6 |
| Scorch Time $TS_5$ (min.) | 2.6 | 2.8 | 2.6 | 3.1 |
| MH, (in-lb.) | 48.0 | 35.0 | 48.1 | 35.4 |

Example 22

As a control, a masterbatch of ethylene propylene diene ("EPDM") terpolymer, available as NORDEL 1040™, was masticated on a two roller mill until an acceptable bead was established. For each 100 parts of EPDM, and in accordance with the recipe listed on Table 5, 100 parts of semireinforcing carbon black, 50 parts of SUNPAR 2280™, a proprietary plasticizer, 5 parts of zinc oxide, 1 part of stearic acid, 1 part of AGERITE RESIN D™, 7.5 parts of DICUP 4OKE™, 19.6 parts of zinc diacrylate, and 0.4 parts Ethanox 703™ were added slowly to the flux roll and the band was cut and mixed until a uniform, smooth band was developed. Thereafter, vulcanization characteristics were determined as for the NBR Example 17 and the results reported on Table 5.

Examples 23–25

Rubber compositions were prepared and tested as for Example 22 except that the recipes for Examples 23 through 25, found on Table 5, were followed.

Example 23 involved the substitution of 19.6 parts of zinc dimethacrylate for the zinc diacrylate of Example 22.

Example 24 involved the substitution of 0.52 parts of the propionic acid salt of Example 12 and the substitution of 19.48 parts of zinc diacrylate for the 0.4 parts Ethanox 703™ and the 19.6 parts of zinc diacrylate of Example 22, respectively.

Example 25 involved the substitution of 0.52 parts of the propionic acid salt of Example 12 and the substitution of 19.48 parts of zinc dimethacrylate for the 0.4 parts Ethanox-703 and the 19.6 parts of zinc dimethacrylate of Example 23, respectively.

TABLE 5

| Example | 22 | 23 | 24 | 25 |
|---|---|---|---|---|
| EPDM | 100 | 100 | 100 | 100 |
| carbon black | 100 | 100 | 100 | 100 |
| plasticizer | 50 | 50 | 50 | 50 |
| zinc oxide | 5 | 5 | 5 | 5 |
| stearic acid | 1 | 1 | 1 | 1 |
| Agerite Resin D | 1 | 1 | 1 | 1 |
| Dicup 40KE | 7.5 | 7.5 | 7.5 | 7.5 |
| zinc diacrylate | 19.6 | — | 19.48 | — |
| zinc dimethacrylate | — | 19.6 | — | 19.48 |
| Ethanox-703 | 0.4 | 0.4 | — | — |
| propionic acid salt | — | — | 0.52 | 0.52 |
| TS$_2$ (min.; 320°F.) | 2.3 | 2.3 | 2.3 | 2.2 |
| TS$_5$ (min.; 320°F.) | 3.2 | 2.7 | 3.3 | 2.7 |
| MH (in-lb.) | 21.0 | 13.5 | 20.7 | 13.6 |

Other embodiments of the invention will be apparent to those skilled in the art from a consideration of this specification or practice of the invention disclosed herein. It is intended that the specification and examples be considered as exemplary only, with the true scope and spirit of the invention being indicated in the following claims.

What is claimed is:

1. A curable elastomer composition, comprising:
   (a) an elastomer;
   (b) a scorch retarding effective mount of a scorch retarder which is an acid salt of an aminoalkyl phenol having the formula:

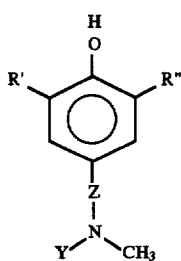

(I)

wherein:
   R' and R" are each independently lower alkyl of from 1 to 6 carbon atoms:
   Z is an alkylene radical containing from 1 to 12 carbon atoms; and
   Y is an alkyl, cycloalkyl, aryl, aralkyl radical, or a lower alkyl-substituted derivative of the aryl radicals containing from 1 to 6 carbon atoms in the alkyl chain and of an aminoalkyl phenol composition having the formula.

2. The composition of claim 1, wherein R' and R" are each tertiary alkyl hydrocarbons.

3. The composition of claim 2, wherein Z is an alkylene radical containing from 1 to 3 carbon atoms.

4. The composition of claim 3, wherein Y is lower alkyl containing from 1 to 6 carbon atoms.

5. The composition of claim 1, wherein the phenolic scorch retarder acid salt is the acid salt of 2,6-di-t-butyl-4-[dimethylamino]methyl phenol.

6. The composition of claim 1, wherein the phenolic scorch retarder acid salt is present in an amount from about 0.01 to about 2.0 parts by weight per 100 parts by weight of elastomer.

7. The composition of claim 1, wherein the phenolic scorch retarder acid salt is present in an amount from about 0.02 to about 0.5 parts by weight per 100 parts by weight of elastomer.

8. The composition of claim 1, wherein the elastomer is an elastomeric organic high polymer.

9. The composition of claim 1, wherein the elastomer is a synthetic rubbery polymer of conjugated dienes.

10. The composition of claim 1, wherein the elastomer is a natural rubber.

11. The composition of claim 1, wherein the elastomer is a nitrile butadiene rubber.

12. The composition of claim 1, wherein the free radical generating compound is a peroxide, percarbonate, or azo compound.

13. The composition of claim 1, wherein the free radical generating compound is a peroxide.

14. The composition of claim 13, wherein the peroxide is a di-tertiary peroxide.

15. The composition of claim 14 wherein the peroxide is a di-tertiary butyl peroxide.

16. The composition of claim 15 wherein the peroxide is dicumyl peroxide.

17. The composition of claim 1, further comprising a cross-linking effective amount of a polyfunctional monomer coagent.

18. The composition of claim 17, wherein the monomer coagent is trimethylol propane tri(meth)acrylate, pentaerythritol tetra(meth)acrylate, glycerol tri(meth)acrylate, trimethylol ethane tri(meth)acrylate, 1,3-butylene glycol di(meth)acrylate, ethylene glycol dimethacrylate, 1,4-butylene glycol dimethacrylate, polyethylene glycol 200 dimethacrylate, di-α-olefin derived polymethylene di(meth)acrylates and mixtures thereof with alkyl mono(meth)acrylates, dipentaerythritol tetra(penta)acrylate and methacrylate, di-trimethylol propane tetraacrylate and methacrylate, diallyl phthalate, diallyl chloroendate, diallyl isophthalate, diallyl terephthalate, triallyl cyanurate, triallyl isocyanurate, triallyl trimellitate, the diallyl ethers or the triallyl ethers of trimethylol propane, trimethylol ethane and pentaerythritol, zinc di(meth)acrylate or the monobasic salts thereof, or the poly(meth)acrylate derivatives of oxyalkylated polyols.

19. The composition of claim 17, wherein the monomer coagent is zinc diacrylate.

20. The composition of claim 17, wherein the monomer coagent is zinc dimethacrylate.

21. The composition of claim 17, wherein the monomer coagent is present in an amount from about 0.01 to about 100 parts by weight per 100 parts by weight of elastomer.

22. The composition of claim 17, wherein the monomer coagent is present in an amount from about 0.1 to about 20 parts by weight per 100 parts by weight of elastomer.

23. The composition of claim 2, further comprising a cross-linking effective amount of a polyfunctional monomer coagent, wherein:

Z is an alkylene radical containing from 1 to 3 carbon atoms;

Y is lower alkyl containing from 1 to 6 carbon atoms;

the phenolic scorch retarder acid salt is the acid salt of 2,6-di-t-butyl-4-[dimethylamino]methyl phenol;

the phenolic scorch retarder acid salt is present in an amount from about 0.02 to about 0.5 parts by weight per 100 parts by weight of elastomer;

the elastomer is a nitrile butadiene rubber;

the peroxide is dicumyl peroxide;

the monomer coagent is zinc diacrylate or zinc dimethacrylate; and the monomer coagent is present in an amount from about 0.1 to about 20 parts by weight per 100 parts by weight of elastomer.

24. A method for providing a curable elastomer composition, comprising the steps of:

(a) providing a scorch retarder acid salt of an aminoalkyl phenol having the formula of claim 1;

(b) incorporating the phenolic scorch retarder acid salt into an elastomer;

(c) incorporating a free radical generating compound into the elastomer.

25. The method of claim 24, wherein:

the phenolic scorch retarder acid salt is formed by reacting a phenolic scorch retarder with an acid; and the phenolic scorch retarder is 2,6-di-t-butyl-4-[dimethylamino]methyl phenol.

26. The method of claim 25 wherein the acid is propionic acid.

27. The method of claim 24, wherein the phenolic scorch retarder acid salt is the acid salt of 2,6-di-t-butyl-4-[dimethylamino]methyl phenol.

28. The method of claim 24, wherein the phenolic scorch retarder acid salt is incorporated into the elastomer by addition to a flux roll.

29. The method of claim 24, wherein:

step (a) is accomplished by first dissolving the phenolic scorch retarder in a monomer coagent, and then reacting the phenolic scorch retarder with an acid;

step (b) is accomplished by adding the monomer coagent containing the phenolic scorch retarder acid salt to the elastomer.

30. The method of claim 24, wherein the elastomer is a synthetic rubbery polymer of conjugated dienes.

31. The method of claim 24, wherein the elastomer is a natural rubber.

32. The method of claim 24, wherein the elastomer is a nitrile butadiene rubber.

33. The method of claim 24, wherein the free radical generating compound is a peroxide, percarbonate, or azo compound.

34. The method of claim 24, wherein the free radical generating compound is dicumyl peroxide.

35. The method of claim 24, further comprising the step of:

(d) incorporating a cross-linking effective amount of a polyfunctional monomer coagent into the elastomer.

36. The method of claim 35, wherein the monomer coagent is zinc diacrylate.

37. The method of claim 35, wherein the monomer coagent is zinc dimethacrylate.

38. The method of claim 24, further comprising the step of:

(d) incorporating a cross-linking effective amount of a polyfunctional monomer coagent into the elastomer, wherein:

the phenolic scorch retarder acid salt is the acid salt of 2,6-di-t-butyl-4-[dimethylamino]methyl phenol;

the phenolic scorch retarder acid salt is incorporated into the elastomer by dissolving the phenolic scorch retarder acid salt in a monomer coagent and adding the resulting mixture to the elastomer;

the elastomer is a nitrile butadiene rubber;

the free radical generating compound is dicumyl peroxide; and the monomer coagent is zinc diacrylate or zinc dimethacrylate.

39. A cured composition formed by curing the composition of claim 1.

40. A cured composition formed by curing the composition of claim 4.

41. A cured composition formed by curing the composition of claim 5.

42. A cured composition formed by curing the composition of claim 11.

43. A cured composition formed by curing the composition of claim 16.

44. A cured composition formed by curing the composition of claim 19.

45. A cured composition formed by curing the composition of claim 20.

46. A cured composition formed by curing the composition of claim 23.

* * * * *